(12) United States Patent
Nakano et al.

(10) Patent No.: US 11,827,736 B2
(45) Date of Patent: Nov. 28, 2023

(54) POLYTHIOL COMPOSITION, POLYMERIZABLE COMPOSITION, RESIN, MOLDED BODY, OPTICAL MATERIAL, AND LENS

(71) Applicant: MITSUI CHEMICALS, INC., Tokyo (JP)

(72) Inventors: Shotaro Nakano, Omuta (JP); Masaru Kawaguchi, Fukuoka (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 17/778,439

(22) PCT Filed: Nov. 9, 2021

(86) PCT No.: PCT/JP2021/041222
§ 371 (c)(1),
(2) Date: May 20, 2022

(87) PCT Pub. No.: WO2022/102625
PCT Pub. Date: May 19, 2022

(65) Prior Publication Data
US 2022/0403092 A1 Dec. 22, 2022

(30) Foreign Application Priority Data
Nov. 13, 2020 (JP) ................. 2020-189834

(51) Int. Cl.
| | | |
|---|---|---|
| *C08G 18/38* | (2006.01) |
| *C08G 18/24* | (2006.01) |
| *C08G 18/76* | (2006.01) |
| *C08G 18/10* | (2006.01) |
| *C08K 5/45* | (2006.01) |
| *G02B 1/04* | (2006.01) |

(52) U.S. Cl.
CPC ......... *C08G 18/3876* (2013.01); *C08G 18/10* (2013.01); *C08G 18/246* (2013.01); *C08G 18/7642* (2013.01); *C08K 5/45* (2013.01); *G02B 1/041* (2013.01)

(58) Field of Classification Search
None
See application file for complete search history.

(56) References Cited

U.S. PATENT DOCUMENTS

| | | |
|---|---|---|
| 5,087,758 A | 2/1992 | Kanemura et al. |
| 6,395,867 B1 | 5/2002 | Maignan |
| 6,475,495 B1 | 11/2002 | Maignan et al. |
| 2009/0264613 A1* | 10/2009 | Kuma ................ C08G 18/3876 568/66 |
| 2015/0094443 A1 | 4/2015 | Kawaguchi et al. |
| 2015/0133692 A1 | 5/2015 | Kawaguchi et al. |
| 2017/0009002 A1 | 1/2017 | Tsukada et al. |

FOREIGN PATENT DOCUMENTS

| | | | |
|---|---|---|---|
| CN | 101512396 A | * | 8/2009 |
| JP | H02270859 A | | 11/1990 |
| JP | 2000509763 A | | 8/2000 |
| JP | 2001527103 A | | 12/2001 |
| WO | 2014027427 A1 | | 2/2014 |
| WO | 2015119220 A1 | | 8/2015 |

* cited by examiner

*Primary Examiner* — Tae H Yoon
(74) *Attorney, Agent, or Firm* — BUCHANAN INGERSOLL & ROONEY PC

(57) ABSTRACT

Provided is a polythiol composition including a polythiol compound (A) and a compound represented by the following Formula (1), wherein, in high performance liquid chromatography measurement, a peak area of the compound represented by Formula (1) is 9.0 or less with respect to a total peak area 100 of all compounds contained in the polythiol composition. In Formula (1), X represents a carbon atom or a sulfur atom.

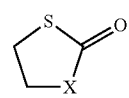

(1)

9 Claims, No Drawings

POLYTHIOL COMPOSITION, POLYMERIZABLE COMPOSITION, RESIN, MOLDED BODY, OPTICAL MATERIAL, AND LENS

CROSS REFERENCE OF RELATED APPLICATIONS

This application is a national stage application of PCT/JP2021/041222, filed on Nov. 9, 2021, which in turn claims priority to Japanese Patent Application No. 2020-189834, filed on Nov. 13, 2020. The entire content of each of the prior applications is hereby incorporated by reference.

TECHNICAL FIELD

The present disclosure relates to a polythiol composition, a polymerizable composition, a resin, a molded body, an optical material, and a lens.

BACKGROUND ART

Plastic lenses are lighter and less likely to break than inorganic lenses, and can be dyed. Thus, in recent years, plastic lenses have rapidly become widespread in optical elements such as spectacle lenses and camera lenses.

Resins for plastic lenses have been required to have higher performance, and have been required to have a higher refractive index, a higher Abbe number, a lower specific gravity, higher heat resistance, and the like. Various resin materials for lenses have been developed and used so far.

For example, Patent Document 1 describes a mercapto compound represented by a specific structural formula.

For example, Patent Document 2 describes a method of producing a polythiol compound including: a process of reacting 2-mercaptoethanol with an epihalohydrin compound represented by a specific Formula (1) at a temperature of from 10 to 50° C. to obtain a polyalcohol compound represented by a specific Formula (2); a process of reacting the obtained polyalcohol compound represented by Formula (2) with thiourea in the presence of hydrogen chloride to obtain an isothiuronium salt; a process of adding ammonia water to a reaction liquid containing the obtained isothiuronium salt within 80 minutes while maintaining the reaction liquid at a temperature of from 15 to 60° C. to hydrolyze the isothiuronium salt, thereby obtaining a polythiol compound represented by a specific Formula (5); and a process of adding hydrochloric acid at a concentration of from 25 to 36% to a solution containing the obtained polythiol compound and washing the solution at a temperature of from 10 to 50° C. to purify the polythiol compound.

Patent Document 1: Japanese Patent Application Laid-Open (JP-A) No. 1402.270859
Patent Document 2: WO 2014-027427A

SUMMARY OF INVENTION

Technical Problem

A resin obtained by curing a polymerizable composition containing a polythiol compound may be required to have a reduced yellow index and degree of opacity.

Actually, a polymerizable composition containing a polythiol compound often contains a compound other than the polythiol compound.

The present inventors have found that, in the case in which a polymerizable composition contains a compound other than the polythiol compound, the yellow index and degree of opacity tend to be easily impaired in the resulting resin.

As a result of various studies on the above tendency, the present inventors have found that it may be difficult to obtain a resin having a reduced yellow index and degree of opacity.

An object of an embodiment of the present disclosure is to provide a polythiol composition from which a resin having a reduced yellow index can be produced.

Solution to Problem

Means to solve the above-described problems include the following embodiments.

<1> A polythiol composition, comprising:
a polythiol compound (A), and
a compound represented by the following Formula (1), wherein, in high performance liquid chromatography measurement, a peak area of the compound represented by Formula (1) is 9.0 or less with respect to the total peak area 100 of all compounds contained in the polythiol composition:

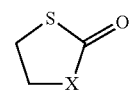

(1)

wherein, in Formula (1), X represents —$CH_2$— or a sulfur atom.

<2> The polythiol composition according to <1>, wherein the polythiol compound (A) comprises a polythiol compound obtained from raw materials comprising 2-mercaptoethanol and thiourea.

<3> The polythiol composition according to <1> or <2>, wherein the polythiol compound (A) comprises 4-mercaptomethyl-1,8-dimercapto-3,6-dithiaoctane or comprises a mixture of 5,7-dimercaptomethyl-1,11-dimercapto-3,6,9-trithiaundecane, 4,7-dimercaptomethyl-1,11-dimercapto-3,6,9-trithaundecane, and 4,8-dimercaptomethyl-1,11-dimercapto-3,6,9-trithiaundecane.

<4> The polythiol composition according to any one of <1> to <3>, comprising:
a polythiol compound (A) containing 4-mercaptomethyl-1,8-dimercapto-3,6-dithiaoctane; and
a compound represented by the following Formula (1), wherein, in high performance liquid chromatography measurement, a peak area of the compound represented by Formula (1) is 9.0 or less with respect to a total peak area 100 of all the compounds contained in the polythiol composition:

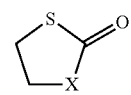

(1)

wherein, in Formula (1), X represents —$CH_2$— or a sulfur atom.

<5> The polythiol composition according to any one of <1> to <4>, wherein, in high performance liquid chromatography measurement, the peak area of the compound represented by Formula (1) is more than 0 with respect to the total peak area 100 of all the compounds contained in the polythiol composition.

<6> A polymerizable composition, comprising:
the polythiol composition according to any one of <1> to <5>, and
a polyiso(thio)cyanate compound.

<7> The polymerizable composition according to <6>, wherein the polyiso(thio)cyanate compound comprises at least one selected from pentamethylene diisocyanate, hexamethylene diisocyanate, xylylene diisocyanate, isophorone diisocyanate, bis(isocyanatomethyl)cyclohexane, bis(isocyanatocyclohexyl)methane, 2,5-bis(isocyanatomethyl)bicyclo-[2.2.1]-heptane, 2,6-bis(isocyanatomethyl)bicyclo-[2.2.1]-heptane, tolylene diisocyanate, 4,4'-diphenylmethane diisocyanate, and phenylene diisocyanate.

<8> A resin, comprising a cured product of the polymerizable composition according to <6> or <7>.

<9> A molded body, comprising the resin according to <8>.

<10> An optical material, comprising the resin according to <8>.

<11> A lens, comprising the resin according to <8>.

Advantageous Effects of Invention

According to an embodiment of the present disclosure, a polythiol composition from which a resin having a reduced yellow index can be produced can be provided.

DESCRIPTION OF EMBODIMENTS

In the disclosure, a numerical range indicated using "to" indicates a range including numerical values described before and after "to" as a minimum value and a maximum value, respectively.

With regard to the stepwise numerical ranges described herein, the upper limit value or the lower limit value described in a certain numerical range may be replaced with the upper limit value or the lower limit value of another stepwise numerical range or may be replaced with a value indicated in Examples.

Herein, the amount of each component in a material means the total amount of the plurality of substances present in the material, unless otherwise specified, when there is more than one substance corresponding to each component in the material.

Herein, "iso(thio)cyanate" means isocyanate or isothiocyanate.

<<Polythiol Composition>>

A polythiol composition of the present disclosure includes a polythiol compound (A) and a compound represented by the following Formula (1), wherein, in high performance liquid chromatography measurement, the peak area of the compound represented by Formula (1) is 9.0 or less with respect to the total peak area 100 of the compounds contained in the polythiol composition:

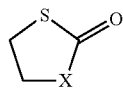

(1)

in Formula (1), X represents —CH$_2$— or a sulfur atom.

Since the polythiol composition of the disclosure contains the above-described configuration, a resin having a reduced yellow index can be produced therefrom.

The polythiol compound (A) preferably contains a polythiol compound obtained from 2-mercaptoethanol and thiourea as raw material.

Examples of the polythiol compound obtained from 2-mercaptoethanol and thiourea, as raw material include a mixture of 5,7-dimercaptomethyl-1,11-dimercapto-3,6,9-trithiaundecane, 4,7-dimercaptomethyl-1,11-dimercapto-3,6,9-trithiaundecane and 4,8-dimercaptomethyl-1,11-dimercapto-3,6,9-trithiaundecane, and 4-mercaptomethyl-1,8-dimercapto-3,6-dithiaoctane.

The polythiol compound (A) preferably contains 4-mercaptomethyl-1,8-dimercapto-3,6-dithiaoctane, or a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane.

(Additional Compound)

The polythiol composition of the disclosure may further contain a compound (XB) obtained by replacing at least one of three or more mercapto groups of a polythiol compound (XA) containing the three or more mercapto groups with a group represented by the following Formula (N1).

[Compound (XB)]

The compound (XB) is a compound obtained by replacing at least one of three or more mercapto groups of a polythiol compound (XA) containing the three or more mercapto groups with a group represented by the following Formula (N1).

The polythiol compound (XA) may be the same compound as or a different compound from the polythiol compound (A) mentioned above, and is preferably the same compound.

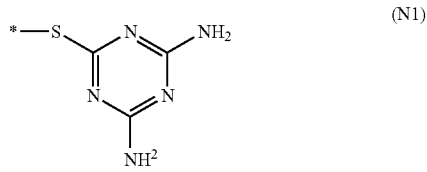 [SMILES: *Sc1nc(N)nc(N)n1]

(N1)

In Formula (N1), * represents a bonding position.

Examples of the compound (XB) is shown below, but the compound (XB) is not limited to the following examples.

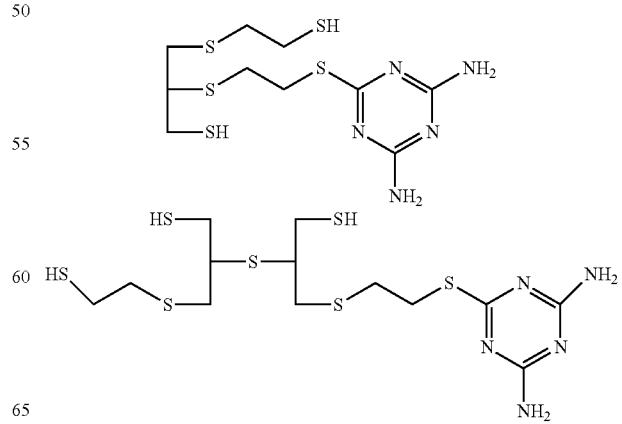

In the case in which a polythiol composition of a first embodiment as described below further contains the compound (XB), the ratio of the compound represented by Formula (1) to the compound (XB) (compound represented by Formula (1)/compound (XB)) is preferably from 0.5 to 18, more preferably from 1 to 15, and still more preferably 2 to 12, from the viewpoint of reducing the yellow index and degree of opacity of a resin to be obtained.

In the case in which a polythiol composition of a second embodiment as described below further contains the compound (XB), the ratio of the compound represented by Formula (1) to the compound (XB) (compound represented by Formula (1)/compound (XB)) is preferably from 0.1 to 9, more preferably from 0.5 to 7, and still more preferably from 0.9 to 5, from the viewpoint of reducing the yellow index and degree of opacity of a resin to be obtained and from the viewpoint of favorably maintaining the pot life of the polymerizable composition of the disclosure.

The ratio of the compound represented by Formula (1) to the compound (XB) (compound represented by Formula (1)/compound (XB)) is the ratio of the peak area of the compound represented by Formula (1) to the peak area of the compound (XB) in the case in which the polythiol composition is subjected to high performance liquid chromatography measurement. The measurement conditions of high performance liquid chromatography are as described in <Measurement of Peak Area of Compound Represented by Formula (1)> as described below.

The polythiol composition of the disclosure includes the following polythiol compositions of the first and second embodiments.

<Polythiol Composition of First Embodiment>

The polythiol composition of the first embodiment contains a polythiol compound (A) containing 4-mercaptomethyl-1,8-dimercapto-3,6-dithiaoctane and a compound represented by the following Formula (1), wherein, in high performance liquid chromatography measurement, the peak area of the compound represented by Formula (1) is 9.0 or less with respect to the total peak area 100 of the compounds contained in the polythiol composition:

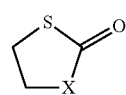
(1)

in Formula (1), X represents —CH$_2$— or a sulfur atom.

Since the polythiol composition of the first embodiment includes the above-described configuration, a resin having a reduced yellow index and degree of opacity can be produced therefrom in the case in which a combination of 4-mercaptomethyl-1,8-dimercapto-3,6-dithiaoctane and a specific sulfur compound is contained in the polymerizable composition.

<Compound Represented by Formula (1)>

The polythiol composition of the first embodiment contains a compound represented by the following Formula (1):

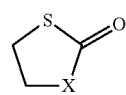
(1)

in Formula (1), X represents —CH$_2$— or a sulfur atom.

Since the polythiol composition of the first embodiment contains the compound represented by the following Formula (1), the yellow index and degree of opacity of the resulting resin can be reduced in the case in which a combination of 4-mercaptomethyl-1,8-dimercapto-3,6-dithiaoctane and a specific sulfur compound is contained in the polymerizable composition. Since the polythiol composition of the first embodiment contains the above-described configuration, a resin having a reduced degree of opacity can be produced from the polythiol composition.

In the polythiol composition of the first embodiment, the peak area of the compound represented by Formula (1) is 9.0 or less with respect to the total peak area 100 of the compounds contained in the polythiol composition, in high performance liquid chromatography measurement.

In the case in which the peak area of the compound represented by Formula (1) is 9.0 or less, the yellow index and degree of opacity of a resin to be obtained can be reduced.

From the same viewpoint as described above, the peak area is preferably 7.0 or less, more preferably 5.0 or less, still more preferably 4.0 or less, and particularly preferably 3.0 or less, with respect to the total peak area 100 of the compounds contained in the polythiol composition.

The "peak area of the compound represented by Formula (1) with respect to the total peak area 100 of the compounds contained in the polythiol composition" means a relative value of the peak area of the compound represented by Formula (1) in the case in which the total peak area of the compounds contained in the polythiol composition is taken as 100.

In high performance liquid chromatography measurement, the peak area of the compound represented by Formula (1) is preferably more than 0, more preferably 0.02 or more, still more preferably 0.05 or more, particularly preferably 0.1 or more, particularly preferably 0.2 or more, particularly preferably 0.3 or more, even more preferably 0.5 or more, and still even more preferably 0.8 or more, with respect to the total peak area 100 of the compounds contained in the polythiol composition, from the viewpoint of reducing the burden of work of purifying and removing the compound represented by Formula (1) from the polythiol composition.

In the case in which the peak area of the compound represented by Formula (1) satisfies the range of the lower limit, the rate of thickening can be enhanced, and thus polymerization can be facilitated.

A method of adjusting the peak area of the compound represented by Formula (1) with respect to the total peak area 100 of the compounds contained in the polythiol composition is not particularly limited, and the peak area can be adjusted by, for example, operations such as column purification, washing, extraction, or crystallization.

<Measurement of Peak Area of Compound Represented by Formula (1)>

The peak area of the compound represented by Formula (1) with respect to the total peak area 100 of the compounds contained in the polythiol composition can be determined by performing high performance liquid chromatography (HPLC) measurement under the following conditions.

The proportion of the compound contained in the polythiol composition with respect to the total peak area 100 of the compounds contained in the polythiol composition is only required to be calculated by determining the peak area that appears during retention time of 3.6 minutes to 4.8 minutes as the peak area of the compound represented by Formula 1).

(HPLC Conditions)

Column: YMC-PACK ODS-A A-312 (SSΦ6 mm×150 mm)

Mobile phase: acetonitrile/0.01 mol/L-potassium dihydrogen phosphate aqueous solution=60/40 (vol/vol)

Column temperature: 40° C.

Flow rate: 1.0 ml/min

Detector: UV detector, wavelength 230 nm

Preparation of measurement solution: 160 mg of a sample is dissolved and mixed with 10 ml of acetonitrile.

Amount poured: 2 μL (Polythiol Compound (A))

The polythiol composition of the first embodiment contains a polythiol compound (A) containing 4-mercaptomethyl-1,8-dimercapto-3,6-dithiaoctane.

4-Mercaptomethyl-1,8-dimercapto-3,6-dithiaoctane is a compound represented by the following formula (2):

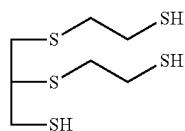
(2)

A method of producing the polythiol compound (A) is not particularly limited, and the polythiol compound (A) can be produced by a known method. For example, the polythiol compound (A) can be produced by the method described in WO 2014/027427A. The polythiol compound (A) is preferably a compound obtained using a catalyst containing at least one selected from the group consisting of metal hydroxides such as sodium hydroxide and potassium hydroxide, and metal carbonates such as sodium carbonate and potassium carbonate, for example, on reacting 2-mercaptoethanol with an epihalohydrin compound.

The polythiol composition of the first embodiment may contain a compound other than the polythiol compound (A) and the compound represented by Formula (1).

For example, the polythiol composition may contain a polythiol compound having a mercapto group or the like other than the polythiol compound (A) and the compound represented by Formula (1) (hereinafter, also referred to as "another polythiol compound").

Examples of another polythiol compound include methanedithiol, 1,2-ethanedithiol, 1,2,3-propanetrithiol, pentaerythritol tetrakis(2-mercaptoacetate), pentaerythritol tetrakis(3-mercaptopropionate), tetrakis(mercaptomethylthiomethyl)methane, tetrakis(2-mercaptoethylthiomethyl)methane, tetrakis (3-mercaptopropylthiomethyl)methane, bis(2-mercaptoethyl)sulfide, bis(2,3-dimercaptopropyl)sulfide, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 2,5-dimercaptomethyl-1,4-dithiane, 2,5-dimercapto-1,4-dithiane, 2,5-dimercaptomethyl-2,5-dimethyl-1,4-dithiane, 1,1,3,3-tetrakis(mercaptomethylthio)propane, 1,1,2,2-tetrakis(mercaptomethylthio)ethane, and 4,6-bis(mercaptomethylthio)-1,3-dithiane.

<Polythiol Composition of Second Embodiment>

A polythiol composition according to the second embodiment contains a polythiol compound (A) containing a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, and a compound represented by the following formula (1), wherein, in high performance liquid chromatography measurement, the peak area of the compound represented by Formula (1) is 9.0 or less with respect to the total peak area 100 of the compounds contained in the polythiol composition:

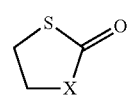
(1)

in Formula (1), X represents —CH$_2$— or a sulfur atom.

Since the polythiol composition of the second embodiment contains the above-described configuration, a resin having a reduced yellow index can be produced from the polythiol composition.

In the polythiol composition of the second embodiment, the peak area of the compound represented by Formula (1) is 9.0 or less with respect to the total peak area 100 of the compounds contained in the polythiol composition, in high performance liquid chromatography measurement.

In the case in which the peak area of the compound represented by Formula (1) is 9.0 or less, the yellow index of a resin to be obtained can be reduced.

From the same viewpoint as described above, the peak area is preferably 7.0 or less, more preferably 5.0 or less, still more preferably 4.0 or less, and particularly preferably 3.0 or less, with respect to the total peak area 100 of the compounds contained in the polythiol composition.

In high performance liquid chromatography measurement, the peak area of the compound represented by Formula (1) is preferably more than 0, more preferably 0.02 or more, still more preferably 0.05 or more, particularly preferably 0.1 or more, particularly preferably 0.2 or more, particularly preferably 0.3 or more, even more preferably 0.5 or more, and still even more preferably 0.8 or more, with respect to the total peak area 100 of the compounds contained in the polythiol composition, from the viewpoint of reducing the burden of work of purifying and removing the compound represented by Formula (1) from the polythiol composition.

In the case in which the peak area of the compound represented by Formula (1) satisfies the range of the lower limit, the rate of thickening can be enhanced, and thus polymerization can be facilitated.

Details of the specific aspects and preferable aspects of the compound represented by Formula (1), the definition and measurement method of the peak area of the compound represented by Formula (1) with respect to the total peak area 100 of the compounds contained in the polythiol composition, and the like in the second embodiment are the same as the details of the specific aspects and preferable aspects of the compound represented by Formula (1), the definition and measurement method of the peak area of the compound represented by Formula (1) with respect to the total peak area 100 of the compounds contained in the polythiol composition, and the like as described above.

The polythiol composition of the second embodiment may contain a compound other than the polythiol compound (A) and the compound represented by Formula (1).

Details of specific examples, preferable specific examples, and the like of the another polythiol compound in the second embodiment are the same as the details of specific examples, preferable specific examples, and the like of the another polythiol compound in the first embodiment.

<<Polymerizable Composition>>

The polymerizable composition of the disclosure includes the polythiol composition of the disclosure and a polyiso(thio)cyanate compound.

(Polyiso(thio)cyanate Compound)

The polyiso(thio)cyanate compound is not particularly limited as long as the effects of the present disclosure can be exerted, and any conventionally known compound can be used. Any compound having at least two iso(thio)cyanate groups in one molecule is not particularly limited, and specific examples thereof include aliphatic polyisocyanate compounds such as tetramethylene diisocyanate, pentamethylene diisocyanate, hexamethylene diisocyanate, heptamethylene diisocyanate, octamethylene diisocyanate, 2,2,4-trimethythexamethylene diisocyanate, 2,4,4-trimethylhexamethylene diisocyanate, lysine diisocyanate methyl ester, lysine triisocyanate, and xylylene diisocyanate;

alicyclic polyisocyanate compounds such as isophorone diisocyanate, bis(isocyanatomethyl)cyclohexane, bis(isocyanatocyclohexyl)methane, dicyclohexyldimethylmethane diisocyanate, 2,5-bis(isocyanatomethyl)bicyclo-[2.2.1]-heptane, 2,6-bis(isocyanatomethyl)bicyclo-[2.2.1]-heptane, 3,8-bis(isocyanatomethyl)tricyclodecane, 3,9-bis(isocyanatomethyl)tricyclodecane, 4,8-bis(isocyanatomethyl)tricyclodecane, and 4,9-bis(isocyanatomethyl)tricyclodecane;

aromatic polyisocyanate compounds such as tolylene diisocyanate, 4,4'-diphenylmethane diisocyanate, diphenyl sulfide-4,4-diisocyanate, and phenylene diisocyanate;

heterocyclic polyisocyanate compounds such as 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyptetrahydrothiophene, 2,5-diisocyanato-1,4-dithiane, 2,5-bis(isocyanatomethyl)-1,4-dithiane, 4,5-diisocyanato-1,3-dithiolane, and 4,5-bis(isocyanatomethyl)-1,3-dithiolane;

aliphatic polyisothiocyanate compounds such as hexamethylene diisothiocyanate, lysine diisothiocyanate methyl ester, lysine triisothiocyanate, and xylylene diisothiocyanate;

alicyclic polyisothiocyanate compounds such as isophorone diisothiocyanate, bis(isothiocyanatomethyl)cyclohexane, bis(isothiocyanatocyclohexyl)methane, cyclohexane diisothiocyanate, methylcyclohexane diisothiocyanate, 2,5-bis(isothiocyanatomethyl)bicyclo-[2.2.1]-heptane, 2,6-bis(isothiocyanatomethyl)cyclo-[2.2.1]-heptane, 3,8-bis(isothiocyanatomethyl)tricyclodecane, 3,9-bis(isothiocyanatomethy)tricyclodecane, 4,8-bis(isothiocyanatomethy)tricyclodecane, and 4,9-bis(isothiocyanatomethyl)tricyclodecane;

aromatic polyisothiocyanate compounds such as tolylene diisothiocyanate, 4,4-diphenylmethane diisothiocyanate, and diphenyl disulfide-4,4-diisothiocyanate; and sulfur-containing heterocyclic polyisothiocyanate compounds such as 2,5-dlisothiocyanatothiophene, 2,5-bis(isothiocyanatomethyl)thiophene, 2,5-isothiocyanatotetrahydrothiophene, 2,5-bis(isothiocyanatomethyl)tetrahydrothiophene, 3,4-bis(isothiocyanatomethyl)tetrahydrothiophne, 2,5-diisothiocyanato-1,4-dithiane, 2,5-bis(isothiocyanatomethyl)-1,4-dithiane, 4,5-diisothiocyanato-1,3-dithiolane, and 4,5-bis(isothiocyanatomethyl)-1,3-dithiolane. The polyiso(thio)cyanate compound can contain at least one selected from these compounds.

As the polyiso(thio)cyanate compound, a halogen-substituted product such as a chlorine-substituted product or a bromine-substituted product, an alkyl-substituted product, an alkoxy-substituted product, a nitro-substituted product, a prepolymer-type modified product with a polyhydric alcohol, a carbodiimide-modified product, a urea-modified product, a burette-modified product, or a dimerization or trimerization reaction product of these compounds can also be used.

The polyiso(thio)cyanate compound is preferably a polyisocyanate compound, and preferably comprises at least one selected from pentamethylene diisocyanate, hexamethylene diisocyanate, xylylene diisocyanate, isophorone diisocyanate, bis(isocyanatomethyl)cyclohexane, bis(isocyanatocyclohexyl)methane, 2,5-bis(isocyanatomethyl)bicyclo-[2.2.1]-heptane, 2,6-bis(isocyanatomethyl)bicyclo-[2.2.1]-heptane, tolylene diisocyanate, 4,4?-diphenylmethane diisocyanate, and phenylene diisocyanate.

The mixing ratio of the polythiol composition and the polviso(thio)cyanate compound is not particularly limited, and for example, the molar ratio of mercapto groups of the polythiol compound contained in the polythiol composition to iso(thio)cyanate groups of the polyiso(thio)cyanate compound (mercapto groups/iso(thio)cyanate groups) is preferably from 0.5 to 3.0, more preferably from 0.6 to 2.0, and still more preferably from 0.8 to 1.3. In the case in which the mixing ratio is within the above range, it tends to be possible to satisfy various performance characteristics such as a refractive index and heat resistance required for a plastic lens or the like in a well-balanced manner.

The polymerizable composition of the disclosure may contain other components other than the polythiol compound and the polyiso(thio)cyanate compound for the purpose of improving various physical properties and operability of the resin, polymerization reactivity of the polymerizable composition, and the like.

Examples of the other component include a polymerization catalyst, an internal mold release agent, a resin modifier, a chain extender, a crosslinking agent, a radical scavenger, a light stabilizer, an ultraviolet absorber, an antioxidant, an oil soluble dye, a filler, an adhesion improver, an antibacterial agent, an antistatic agent, a dye, a fluorescent brightener, a fluorescent pigment, and a blue ink agent such as an inorganic pigment.

Examples of the polymerization catalyst include a tertiary amine compound, an inorganic acid salt or organic acid salt thereof, a metal compound, a quaternary ammonium salt, and an organic sulfonic acid.

As the internal mold release agent, an acid phosphate ester can be used. Examples of the acid phosphate ester include a phosphoric acid monoester and a phosphoric acid diester, which can be used singly or in a mixture of two or more kinds thereof.

Examples of the resin modifier include an episulfide compound, an alcohol compound, an amine compound, an epoxy compound, an organic acid and an anhydride thereof, and an olefin compound including a (meth)acrylate compound.

The polymerizable composition of the disclosure can be obtained by mixing the above components.

The polymerizable composition of the disclosure when cured into a molded body has a glass transition temperature Tg of preferably 80° C. or higher and more preferably of 85°

C. or higher, from the viewpoint of heat resistance. The glass transition temperature Tg may be 130° C. or lower, or 125° C. or lower.

In the disclosure, the glass transition temperature Tg when the polymerizable composition is formed into a molded body is a value by measured a method in Examples described below using a plastic flat plate molded in accordance with <Production of Plastic Flat Plate>.

<<Molded Body>>

The molded body of the disclosure includes the resin of the disclosure.

The resin of the disclosure includes a cured product of the polymerizable composition of the disclosure.

The method of producing the molded body of the disclosure is not particularly limited, and examples of a preferred production method include cast polymerization. First, a polymerizable composition is poured between molding molds held with a gasket, tape, or the like. At this time, depending on physical properties required for a plastic lens to be obtained, it is often preferable to perform defoaming treatment under reduced pressure, filtration treatment such as filtration under pressure or reduced pressure, or the like if necessary.

The polymerization conditions are not limited because the conditions greatly vary depending on the composition of the polymerizable composition, the type and amount of the catalyst to be used, the shape of the mold, and the like. For example, the polymerization is performed at a temperature of from −50° C. to 150° C. over from 1 hour to 50 hours. In some cases, it is preferable to cure the composition in from 1 hour to 48 hours while the temperature is maintained or gradually raised in a temperature range of 10° C. to 150° C.

The molded body may be subjected to a treatment such as annealing if necessary. The treatment such as annealing is usually performed at from 50° C. to 150° C., preferably at from 90° C. to 140° C., and more preferably at from 100° C. to 130° C.

[Applications]

The resin to be obtained from the polymerizable composition of the disclosure can be used as a material for producing molded bodies of various shapes by changing the type of mold during cast polymerization.

<<Optical Material>>

The optical material of the disclosure includes the resin of the disclosure.

From a molded body obtained from the polymerizable composition of the disclosure, it is possible to obtain a material having a reduced yellow index can be obtained without impairing transparency. From a molded body obtained from the polymerizable composition containing the polythiol composition of the first embodiment, it is also possible to obtain a material having excellent degree of opacity.

Thus, such materials can be used for various optical materials such as plastic lenses.

<<Lens>>

The lens of the disclosure includes the resin of the disclosure.

As the optical material, a lens is particularly suitable.

Examples of the lens include a plastic spectacle lens and a plastic polarizing lens.

[Plastic Spectacle Lens]

The plastic spectacle lens including a lens substrate formed of the molded body of the disclosure may be provided with a coating layer on one side or both sides if necessary.

The plastic spectacle lens of the disclosure comprises a lens substrate including a cured product of the polymerizable composition described above, and a coating layer.

Specific examples of the coating layer include a primer layer, a hard coat layer, an antireflection layer, an antifogging coat layer, an antifouling layer, and a water-repellent layer. These coating layers each can be used singly, or a plurality of coating layers can be layered for use. In the case in which the coating layer is applied to both sides, the same coating layer or a different coating layer may be applied to each side.

In each of these coating layers, known additives such as an infrared absorber for the purpose of protecting eyes from infrared rays, a light stabilizer, or an antioxidant for the purpose of improving the weather resistance of the lens, a photochromic compound, a dye and a pigment for the purpose of improving the fashion of the lens, and additionally, an antistatic agent and the like for the purpose of improving the performance of the lens may be used in combination.

For the layer to be coated by coating, various leveling agents for the purpose of improving coatability may be used.

An anti-fog layer, an anti-contamination layer, or a water-repellent layer may be formed on the antireflection layer if necessary.

Although the embodiments of the disclosure have been described hereinabove, these are exemplary for the disclosure, and various configurations other than those described above can be adopted as long as the effects of the present disclosure are not impaired.

EXAMPLES

Hereinafter, the polythiol compositions of the disclosure will be described in detail with reference to Examples. The polythiol composition of the disclosure is not limited to the description of these Examples in any way. Unless otherwise specified, "parts" are on a mass basis.

<Evaluation Method>

In Examples, methods for evaluating each of the physical properties of plastic flat plates are as follows. The results are as shown in Table 1.

Refractive index (ne), Abbe number (ve)

A Pulfrich refractometer KPR-30 manufactured by Shimadzu Corporation was used to measure the refractive index (ne, nF', and nC') each at a wavelength of 546.1 nm (Mercury e ray), a wavelength of 480.0 nm (Cd F' ray), and a wavelength of 643.9 nm (Cd C' ray), and the refractive index (ne) and the Abbe number (ve) were each determined.

Heat Resistance

A thermomechanical analyzer TMA-60 manufactured by Shimadzu Corporation was used to measure the glass transition temperature Tg by a TMA penetration method (load: 50 g. pin tip: 0.5 mmφ, temperature rising rate: 10° C./min), which was used as an index of heat resistance.

Yellow Index (Also Referred to as YI)

A resin was prepared as a circular plastic flat plate having a thickness of 9 mm and a diameter of 75 mm, and the YI value was determined using a spectrophotometer CM-5 manufactured by Konica. Minolta, Inc.

There is a correlation between the YI value and the yellow index, in which a smaller YI value leads to a lower yellow index of the plastic flat plate and a larger YI value leads to a higher yellow index.

Degree of Opacity

A resin was prepared as a circular plastic flat plate having a thickness of 9 mm and a diameter of 75 mm, and light from a light source (LUMINAR ACE LA-150 A manufactured by HAYASHI-REPIC CO., LTD) was allowed to transmit through a side of the flat plate. An image of light from the front of the flat plate was captured in an image processing apparatus (manufactured by Ube Information Systems, Inc.), and gradation processing was performed on the captured image. The degree of gradation of the processed image was quantified on a pixel to pixel basis, the average value of the numerical values of the degree of gradation of each pixel was obtained, and the degree of opacity of the flat plate was determined.

With a smaller degree of opacity, the degree of impairing the transparency of the resin (here, the flat plate) is smaller (i.e., the resin has excellent transparency).

Hereinafter, the polythiol composition of the first embodiment will be described in detail with reference to Examples. The polythiol composition of the first embodiment is not limited to the description of these Examples in any way.

<Synthesis of Polythiol Compound (A)>

Into a reactor, charged were 124.6 parts by mass of 2-mercaptoethanol and 18.3 parts by mass of degassed water. At from 12° C. to 35° C., 101.5 parts by a 32 mass % aqueous solution of sodium hydroxide were added dropwise over 40 minutes, then 73.6 parts by mass of epichlorohydrin were added dropwise over 4.5 hours at from 29° C. to 36° C., and stirring was continued for 40 minutes. The NMR data confirmed that 1.3 bis(2-hydroxyethylthio)-2-propanol was generated.

331.5 parts by mass of 35.5 mass % hydrochloric acid were charged, then 183.8 parts by mass of thiourea having a purity of 99.90% were charged, and a reaction of thiuronium salt production was performed by stirring the resulting mixture at 110° C. under reflux for 3 hours. After cooling to 45° C., 320.5 parts by mass of toluene were added, the mixture was cooled to 31° C. 243.1 parts by mass of a 25 mass % aqueous ammonia solution were charged at from 31° C. to 41° C. over 44 minutes. The mixture was subjected to a hydrolysis reaction by stirring at from 54° C. to 62° C. for 3 hours to obtain a toluene solution of a polythiol containing 4-mercaptomethyl-1,8-dimercapto-3,6-dithiaoctane as a main component. To this toluene solution, 162.8 parts by mass of 35.5 mass % hydrochloric acid were added, and the mixture was acid-washed at from 35° C. to 43° C. for 1 hour. 174.1 parts by mass of degassed water were added, and the mixture was washed twice at from 35° C. to 45° C. for 30 minutes. 162.1 parts by mass of 0.1 mass % ammonia water were added, and the mixture was washed for 30 minutes. 174.2 parts by mass of degassed water were added, and the mixture was washed twice at from 35° C. to 45° C. for 30 minutes. Toluene and a trace amount of moisture were removed under heating and reduced pressure, and then the residue was filtered under reduced pressure with a 1.2 μm PTFE-type membrane filter to obtain 205.0 parts by mass of a polythiol composition (A) mainly composed of 4-mercaptomethyl-1,8-dimercapto-3,6-dithiaoctane as the polythiol compound (A).

Example 1, Example 2, and Comparative Example 1

The polythiol composition (A) obtained as described above and γ-thiobutyrolactone (manufactured by Sigma-Aldrich Co. LLC; a compound represented by Formula (1)) were mixed to obtain a polythiol composition.

At this time, the compounds were each mixed while the mixing ratio was changed such that the peak area of the compound represented by Formula (1) with respect to the total peak area 100 of the compounds contained in the polythiol composition corresponded to the value described in Table 1.

<Measurement of Proportion (area %) of γ-thiobutyrolactone>

The proportion (area %) of γ-thiobutyrolactone by HPLC was measured by the method described in the section of <Measurement of Peak Area of Compound Represented by Formula (1)> described above.

The results are shown in Table 1.

<Production of Plastic Flat Plate>

Production Example 1

52 parts by mass of m-xylylene diisocyanate, 0.01 parts by mass of dibutyltin dichloride as a curing catalyst, 0.10 parts by mass of ZELEC UN (trade name, a product manufactured by Stepan Company; acid phosphate ester), 1.5 parts by mass of VIOSORB 583 (manufactured by KYODO CHEMICAL CO., LTD.; ultraviolet absorber) were mixed and dissolved at 20° C. 48 parts by mass of the polythiol composition of Example 1 were charged and mixed to obtain a mixed homogeneous liquid. After this homogeneous liquid was degassed at 600 Pa for 1 hour and filtered with a 1 μm TEFLON® filter, the filtered liquid was poured into a mold die composed of a glass mold and tape. The mold die was placed into an oven, gradually heated up from 10° C. to 120° C., and polymerization was performed for 38 hours. After the polymerization was finished, the mold die was taken out from the oven to obtain a resin by releasing from the mold die. The obtained resin was further annealed at 120° C. for 1 hour to produce a plastic flat plate. Physical properties were each determined based on each of the methods of evaluating physical properties of the plastic flat plate described above.

Production Example 2

A plastic flat plate was produced by the same method as that described in Production Example 1 except that 48 parts by mass of the polythiol composition of Example 1 were replaced by 48 parts by mass of the polythiol composition of Example 2 in Production Example 1. Physical properties were each determined based on each of the methods of evaluating physical properties of the plastic flat plate described above.

Production Example 3

A plastic flat plate was produced by the same method as that described in Production Example 1 except that 48 parts by mass of the polythiol composition of Example 1 were replaced by 48 parts by mass of the polythiol composition of Comparative Example 1 in Production Example 1. Physical properties were each determined based on each of the methods of evaluating physical properties of the plastic flat plate described above.

Physical properties of the plastic flat plates of Production Examples 1 to 3 are shown in Table 1.

TABLE 1

|  |  | Example 1 | Example 2 | Comparative Example 1 |
|---|---|---|---|---|
| Polythiol composition | Proportion of peak area of compound represented by Formula (1) with respect to total peak area 100 of compounds contained in polythiol composition | 0.97 | 4.8 | 9.4 |
|  | Proportion of peak area of the compound (XB) with respect to total peak area 100 of compounds contained in polythiol composition | 0.46 | 0.43 | 0.41 |
|  | Compound represented by Formula (1)/compound (XB) | 2.13 | 11.25 | 23.07 |
| Plastic lens | Refractive index ne | 1.665 | 1.665 | 1.664 |
|  | Abbe number ve | 30.8 | 30.7 | 30.6 |
|  | Heat resistance [° C.] | 87.9 | 86.7 | 86.6 |
|  | Yellow index [YI] | 5.06 | 5.20 | 5.63 |
|  | Degree of opacity | 24 | 30 | 44 |

As shown in Table 1, it was possible to produce a resin having a reduced yellow index and degree of opacity from the polythiol compositions according to Examples, the compositions containing a polythiol compound (A) containing 4-mercaptomethyl-1,8-dimercapto-3,6-dithiaoctane and a compound represented by the following Formula (1), the peak area of the compound represented by Formula (1) being 9.0 or less with respect to the total peak area 100 of the compounds contained in the polythiol composition in high performance liquid chromatography measurement. The polythiol compositions according to Examples were also excellent in heat resistance.

On the other hand, it was not possible to produce a resin having a reduced yellow index and degree of opacity from the polythiol composition according to Comparative Example 1, the peak area of the compound represented by Formula (1) being more than 9.0 with respect to the total peak area 100 of the compounds contained in the polythiol composition Hereinafter, the polythiol composition of the second embodiment will be described in detail with reference to Examples. The polythiol composition of the second embodiment is not limited to the description of these Examples in any way.

<Synthesis of Polythiol Composition (A)>

Into a reactor, charged were 51.2 parts by mass of 2-mercaptoethanol, 26.5 parts by mass of degassed water (dissolved oxygen concentration: 2 ppm), and 0.16 parts by mass of a 49 mass % aqueous solution of sodium hydroxide. 61.99 parts by mass of epichlorohydrin were charged dropwise at from 9 to 11° C. over 6.5 hours, and stirring was continued for 60 minutes. The NMR data confirmed that 1-chloro-3-(2-hydroxyethylthio)-2 propanol was generated.

Next, 150.0 parts by mass of a 17.3 mass % sodium sulfide aqueous solution were charged dropwise at from 7 to 37° C. over 5.5 hours, and the mixture was stirred for 120 minutes. The NMR data confirmed that 1,5,9,13-tetrahydroxy-3,7,11-trithiatridecane was generated. Then, 279.0 parts by mass of 35.5 mass % hydrochloric acid were charged, then 125.8 parts by mass of thiourea having a purity of 99.90% were charged, and a reaction of thiuronium salt production was performed by stirring the resulting mixture at 110° C. under reflux for 3 hours. After cooling to 45° C., 214.0 parts by mass of toluene were added, the mixture was cooled to 26° C., and 206.2 parts by mass of a 25 mass % aqueous ammonia solution were charged at from 26° C. to 50° C. over 30 minutes. The mixture was subjected to a hydrolysis reaction by stirring at from 50° C. to 65° C. for 1 hour to obtain a toluene solution of a polythiol mainly composed of 4,8-dimercaptomethyl-1,11-dimercapto-3,6,9-trithiaundecane, 4,7-dimercaptomethyl-1,11-dimercapto-3,6,9-trithiaundecane, and mercaptomethyl-1,11-dimercapto-3,6,9-trithiaundecane. 59.4 parts by mass of 36 mass % hydrochloric acid were added to the toluene solution, and the mixture was acid-washed twice at from 34° C. to 39° C. for 30 minutes. In addition, 118.7 parts by mass of degassed water (dissolved oxygen concentration: 2 ppm) were added, and the mixture was washed 5 times at from 35° C. to 45° C. for 30 minutes, Toluene and a trace amount of moisture were removed under heating and reduced pressure, and then the residue was filtered under reduced pressure with a 1.2 µm PTFE-type membrane filter to obtain 115.9 parts by mass of a polythiol composition (A) mainly composed of 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane as main components.

Example 3, Example 4, and Comparative Example 2

The polythiol composition (A) obtained as described above and γ-thiobutyrolactone (manufactured by Sigma-Aldrich Co. LLC; a compound represented by Formula (1)) were mixed to obtain a polythiol composition.

At this time, the compounds were each mixed while the mixing ratio was changed such that the peak area of the compound represented by Formula (1) with respect to the total peak area 100 of the compounds contained in the polythiol composition corresponded to the value described in Table 2.

<Measurement of Proportion (area %) of γ-thiobutyrolactone>

The proportion (area %) of γ-thiobutyrolactone by HPLC was measured by the method described in the section of <Measurement of Peak Area of Compound Represented by Formula (1)> described above.

The results are shown in Table 2.

<Production of Plastic Flat Plate>

Production Example 4

50.8 parts by mass of m-xylylene diisocyanate, 0.01 parts by mass of dimethyl tin dichloride as a curing catalyst, 0.10 parts by mass of ZELEC UN (a product manufactured by Stepan Company; acid phosphate ester), 0.6 parts by mass of VIOSORB 583 (manufactured by KYODO CHEMICAL CO., ultraviolet absorber), and 0.6 parts by mass of SEESORB 706 (manufactured by Shipro Kasei Kaisha, Ltd.; ultraviolet absorber) were mixed and dissolved at 20° C. 49.2 parts by mass of the polythiol composition of Example 3 were charged and mixed to obtain a mixed homogeneous liquid. After this homogeneous liquid was degassed at 600 Pa for 1 hour and filtered with a 1 µm TEFLON® filter, the filtered liquid was poured into a mold die composed of a glass mold and tape. The mold die was placed into an oven, gradually heated up from 20° C. to 120° C., and polymerization was performed for 30 hours. After the polymerization was finished, the mold die was taken out from the oven to obtain a resin by releasing from the mold die. The obtained resin was further annealed at 120° C. for 1 hour to produce a plastic flat plate. Physical properties were each determined based on each of the methods of evaluating physical properties of the plastic flat plate described above.

Production Example 5

A plastic plate was produced by the same method as that described in Production Example 4 except that 49.2 parts by mass of the polythiol composition of Example 3 were replaced by 49.2 parts by mass of the polythiol composition of Example 4. Physical properties were each determined based on each of the methods of evaluating physical properties of the plastic flat plate described above.

Production Example 6

A plastic flat plate was produced by the same method as that described in Production Example 4 except that 49.2 parts by mass of the polythiol composition of Example 3 were replaced by 49.2 parts by mass of the polythiol composition of Comparative Example 2. Physical properties were each determined based on each of the methods of evaluating physical properties of the plastic flat plate described above.

Physical properties of the plastic flat plates of Production Examples 4 to 6 are shown in Table 2.

TABLE 2

| | | Example 3 | Example 4 | Comparative Example 2 |
|---|---|---|---|---|
| Polythiol composition | Proportion of peak area of compound represented by Formula (1) with respect to total peak area 100 of compounds contained in polythiol composition | 1.1 | 5.0 | 9.8 |
| | Proportion of peak area of the compound (XB) with respect to total peak area 100 of compounds contained in polythiol composition | 1.1 | 1.1 | 1.0 |
| | Compound represented by Formula (1)/compound (XB) | 0.97 | 4.76 | 9.80 |
| Plastic lens | Refractive index ne | 1.669 | 1.669 | 1.669 |
| | Abbe number ve | 31.3 | 31.1 | 31.2 |
| | Heat resistance [° C.] | 100.0 | 99.5 | 97.7 |
| | Yellow index [YI] | 5.40 | 5.48 | 5.74 |
| | Degree of opacity | 33 | 30 | 31 |

As shown in Table 2, it was possible to produce a resin having a reduced yellow index from the polythiol compositions according to Examples, the compositions containing a polythiol compound (A) containing a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane and a compound represented by Formula (1), the peak area of the compound represented by Formula (1) being 9.0 or less with respect to the total peak area 100 of the compounds contained in the polythiol composition in high performance liquid chromatography measurement. The polythiol compositions according to Examples were also excellent in heat resistance.

On the other hand, it was not possible to produce a resin having a reduced yellow index from the polythiol composition according to Comparative Example 2, the peak area of the compound represented by Formula (1) being more than 9.0 with respect to the total peak area 100 of the compounds contained in the polythiol composition.

The disclosure of Japanese Patent Application Laid-Open (JP-A) No. 2020-189834 filed on Nov. 13, 2020 is incorporated herein by reference in its entirety.

All documents, patent applications, and technical standards described herein are incorporated herein by reference to the same extent as if each document, patent application, and technical standard were specifically and individually indicated to be incorporated by reference.

The invention claimed is:

1. A polythiol composition, comprising:
   a polythiol compound (A), and
   a compound represented by the following Formula (1), wherein, in high performance liquid chromatography measurement, a peak area of the compound represented by Formula (1) is more than 0 but 9.0 or less with respect to the total peak area 100 of all compounds contained in the polythiol composition:

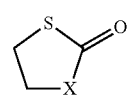

wherein, in Formula (1), X represents —$CH_2$— or a sulfur atom, wherein the polythiol compound (A) comprises 4-mercaptomethyl-1,8-dimercapto-3,6-dithiaoctane or comprises a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane.

2. The polythiol composition according to claim 1, wherein the polythiol compound (A) comprises a polythiol compound obtained from raw materials comprising epihalohydrin, 2-mercaptoethanol and thiourea.

3. The polythiol composition according to claim 1, wherein the polythiol compound (A) comprises 4-mercaptomethyl-1,8-dimercapto-3,6-dithiaoctane.

4. A polymerizable composition, comprising:
   the polythiol composition according to claim 1, and
   a polyiso(thio)cyanate compound.

5. The polymerizable composition according to claim 4, wherein the polyiso(thio)cyanate compound comprises at least one selected from pentamethylene diisocyanate, hexamethylene diisocyanate, xylylene diisocyanate, isophorone diisocyanate, bis(isocyanatomethyl)cyclohexane, bis(isocyanatocyclohexyl)methane, 2,5-bis(isocyanatomethyl)bicyclo-[2.2.1]-heptane, 2,6-bis(isocyanatomethyl)bicyclo-[2.2.1]-heptane, tolylene diisocyanate, 4,4'-diphenyl methane diisocyanate, and phenylene diisocyanate.

6. A resin, comprising a cured product of the polymerizable composition according to claim 4.

7. A molded body, comprising the resin according to claim 6.

8. An optical material, comprising the resin according to claim 6.

9. A lens, comprising the resin according to claim 6.

* * * * *